US012671117B2

(12) United States Patent
Won et al.

(10) Patent No.: US 12,671,117 B2
(45) Date of Patent: Jun. 30, 2026

(54) METHOD OF MANUFACTURING ELECTRODE INCLUDING FOLDING PORTION AND ELECTRODE SHEET INCLUDING FOLDING PORTION

(71) Applicant: LG Energy Solution, Ltd., Seoul (KR)

(72) Inventors: Kwang Ho Won, Daejeon (KR); Jung Shik Oh, Daejeon (KR); Ki Tae Kim, Daejeon (KR); Chan Ki Park, Daejeon (KR); Young Hoon Kim, Daejeon (KR); Hyun Tae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 768 days.

(21) Appl. No.: 17/914,544

(22) PCT Filed: Jun. 8, 2021

(86) PCT No.: PCT/KR2021/007134
§ 371 (c)(1),
(2) Date: Sep. 26, 2022

(87) PCT Pub. No.: WO2021/251720
PCT Pub. Date: Dec. 16, 2021

(65) Prior Publication Data
US 2023/0142103 A1 May 11, 2023

(30) Foreign Application Priority Data
Jun. 10, 2020 (KR) ........................ 10-2020-0070046

(51) Int. Cl.
*H01M 10/0585* (2010.01)
*H01M 4/04* (2006.01)
*H01M 4/88* (2006.01)

(52) U.S. Cl.
CPC ..... *H01M 10/0585* (2013.01); *H01M 4/0404* (2013.01); *H01M 4/8875* (2013.01)

(58) Field of Classification Search
CPC ........... H01M 10/0585; H01M 4/0404; H01M 4/8875; H01M 4/04; H01M 10/045
See application file for complete search history.

(56) References Cited

U.S. PATENT DOCUMENTS

2003/0059675 A1   3/2003   Sasaki et al.
2007/0059603 A1   3/2007   Sasaki et al.
(Continued)

FOREIGN PATENT DOCUMENTS

CN        110268570 A      9/2019
CN        110808418 A      2/2020
(Continued)

OTHER PUBLICATIONS

Machine translation of JP-H0864479-A (Year: 2025).*
(Continued)

*Primary Examiner* — Tong Guo
*Assistant Examiner* — Albert Michael Hilton
(74) *Attorney, Agent, or Firm* — Lerner David LLP

(57) ABSTRACT

The present invention relates to an electrode manufacturing method for manufacturing a foldable battery cell, the electrode manufacturing method including a coating step of forming an electrode mixture coated portion on an electrode sheet so as to include an uncoated portion having no electrode mixture formed thereon by coating, a step of slitting the electrode sheet into a plurality of unit electrode sheets, and a step of notching the slit electrode sheet, wherein the uncoated portion includes an electrode tab formation portion and a folding portion formed so as to be parallel to a direction in which the electrode sheet is taken out.

12 Claims, 4 Drawing Sheets

(56)                References Cited

U.S. PATENT DOCUMENTS

| | | |
|---|---|---|
| 2012/0058387 A1 | 3/2012 | Ahn |
| 2012/0321946 A1* | 12/2012 | Kim ........................ H01M 4/02 |
| | | 29/623.5 |
| 2015/0333360 A1 | 11/2015 | Tajima et al. |
| 2017/0084945 A1 | 3/2017 | Kanemoto et al. |
| 2017/0222193 A1 | 8/2017 | Tajima et al. |
| 2019/0081345 A1 | 3/2019 | Lee et al. |
| 2019/0273237 A1 | 9/2019 | Kawai et al. |
| 2020/0044222 A1 | 2/2020 | Xiao et al. |

FOREIGN PATENT DOCUMENTS

| | | | |
|---|---|---|---|
| EP | 3370283 A1 | | 9/2018 |
| JP | H07153438 A | | 6/1995 |
| JP | H0864479 A | * | 3/1996 |
| JP | 2003-100282 A | | 4/2003 |
| JP | 2008066049 A | | 3/2008 |
| JP | 2015230788 A | | 12/2015 |
| JP | 2015233003 A | | 12/2015 |
| KR | 20120022385 A | | 3/2012 |
| KR | 20120139363 A | | 12/2012 |
| KR | 20150037399 A | | 4/2015 |
| KR | 20170033513 A | | 3/2017 |
| KR | 20170033516 A | | 3/2017 |
| KR | 2017-0055722 A | | 5/2017 |
| KR | 20170100983 A | | 9/2017 |
| KR | 20180082150 A | | 7/2018 |
| WO | 2018138976 A1 | | 8/2018 |

OTHER PUBLICATIONS

International Search Report for Application No. PCT/KR2021/007134 mailed Sep. 7, 2021, pp. 1-3.
Extended European Search Report for Application No. 21822930.0 dated Aug. 12, 2023. 9 pgs.
Search Report dated Apr. 10, 2025 from the Office Action for Chinese Application No. 202180017820.X Issued Apr. 12, 2025, pp. 1-2.

* cited by examiner

【FIG. 1】
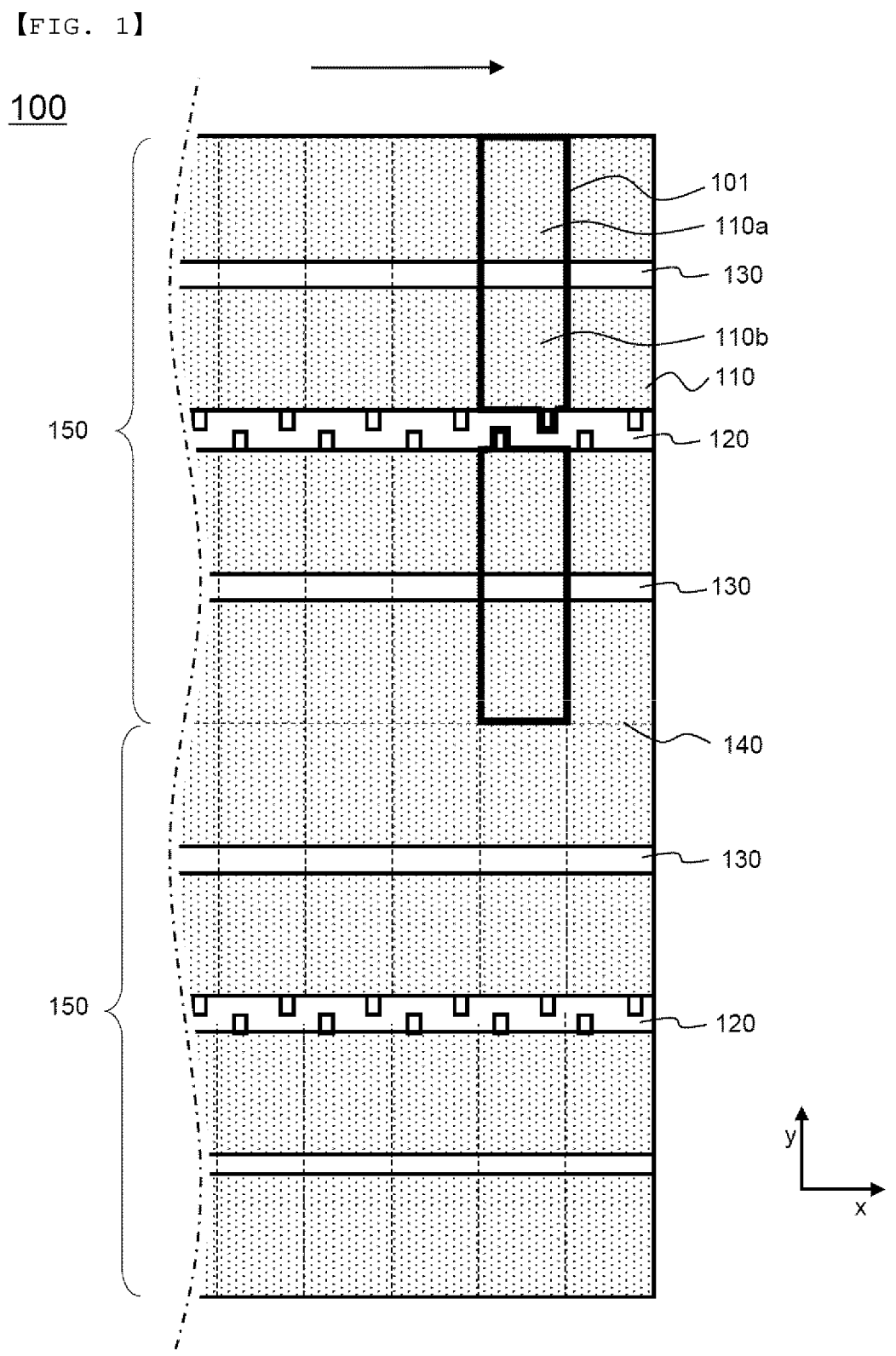

【FIG. 2】
<u>200</u>
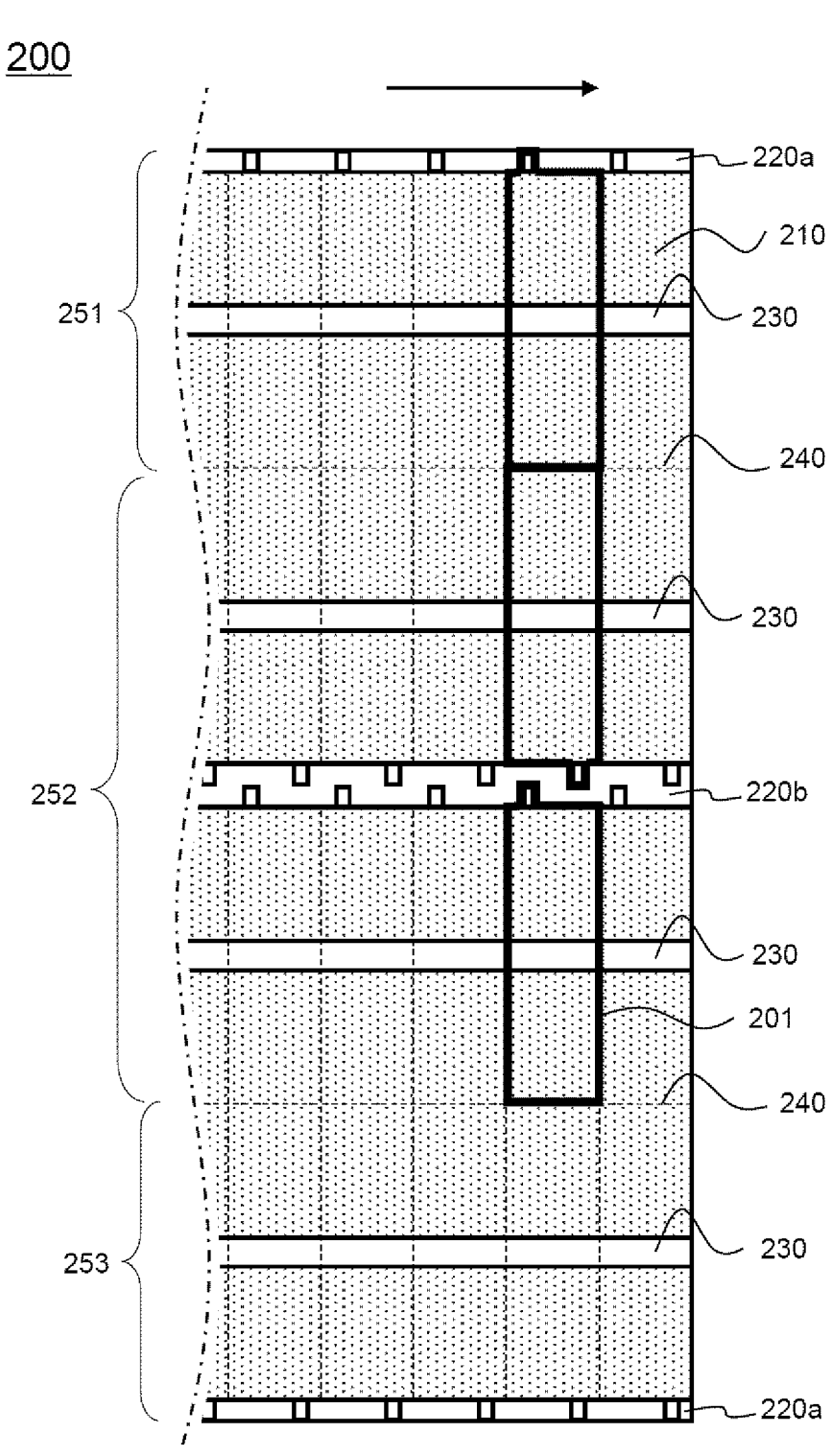

【FIG. 3】
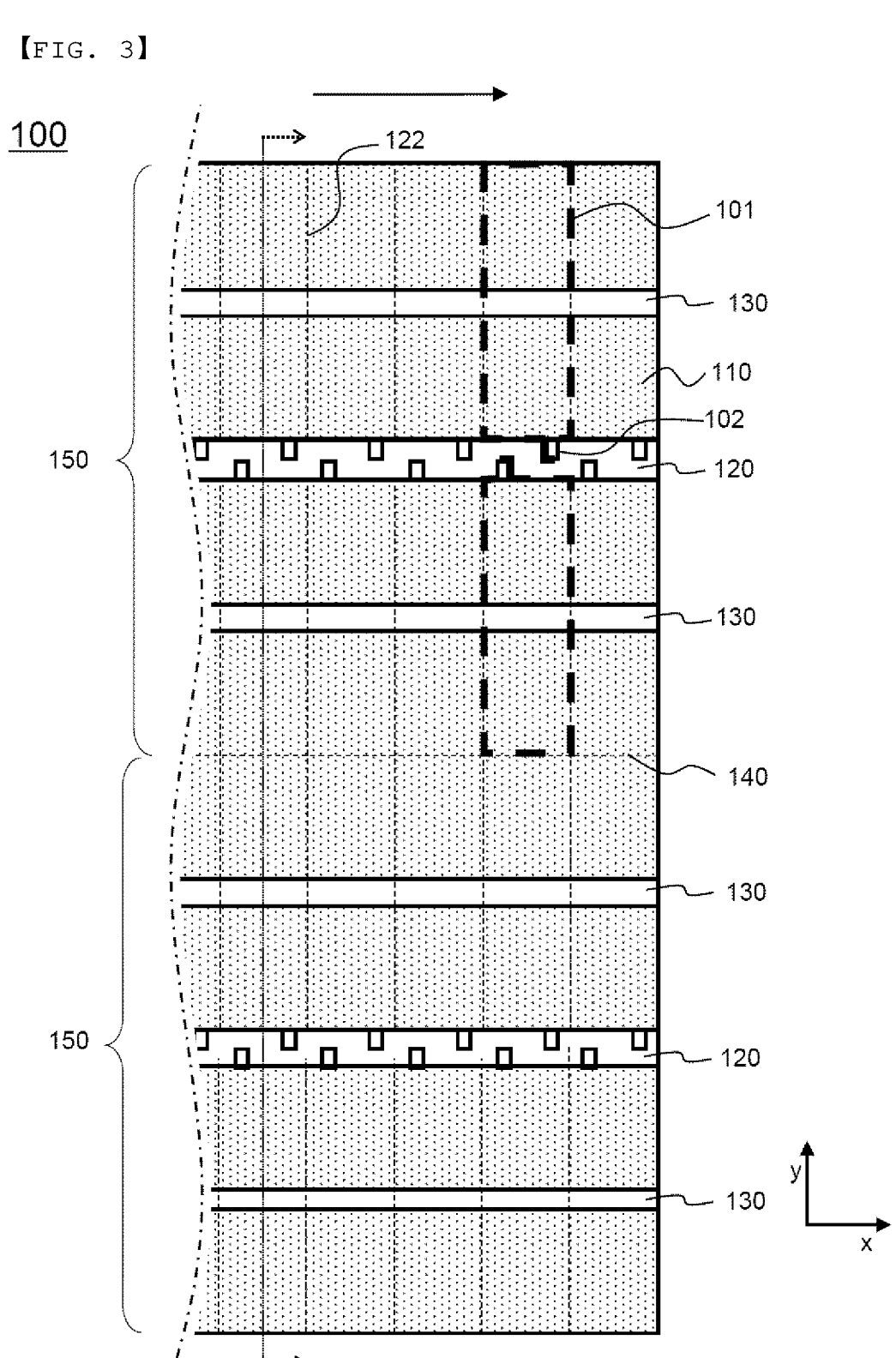

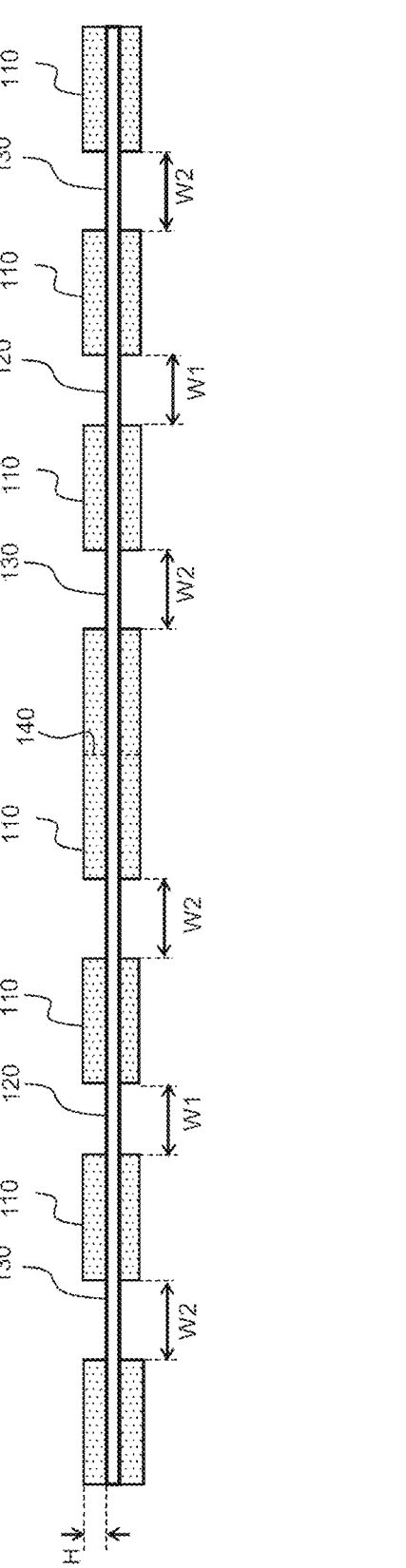
[FIG. 4]

METHOD OF MANUFACTURING ELECTRODE INCLUDING FOLDING PORTION AND ELECTRODE SHEET INCLUDING FOLDING PORTION

CROSS-REFERENCE TO RELATED APPLICATIONS

This application is a national stage entry under 35 U.S.C. § 371 of International Application No. PCT/KR2021/007134, filed on Jun. 8, 2021, which claims priority to Korean Patent Application No. 10-2020-0070046 filed on Jun. 10, 2020, the disclosures of which are hereby incorporated herein by reference in their entireties.

TECHNICAL FIELD

The present invention relates to a method of manufacturing an electrode including a folding portion and an electrode sheet including the folding portion, and more particularly to a method of manufacturing an electrode including a folding portion usable to manufacture a foldable battery cell and an electrode sheet including the folding portion.

BACKGROUND ART

A lithium secondary battery, which is capable of being charged and discharged, has been widely used as an energy source for wireless mobile devices or wearable devices, and has also been used as an energy source for electric vehicles and hybrid electric vehicles presented as alternatives to existing gasoline and diesel vehicles, which cause air pollution.

In addition, with an increase in kinds of miniaturized multifunctional products and a trend of emphasizing design in electronic devices, the number of products based on new shapes, such as a shape including a curve or a geometrical shape, other than conventional simple structures, such as a planar structure and a prismatic structure, has increased.

Lithium secondary batteries having various shapes, such as a stepped shape and a polygonal shape, other than a rectangular shape, have been developed in order to apply the lithium secondary batteries to such products having various shapes.

For example, for a smartphone, the side thereof is curved in order to improve sensation of grip, and flexible display products capable of being bent or folded have come on the stage.

In the case in which a rectangular battery cell is used in a bendable or foldable device, there is a problem in that dead space is formed in many instances. Therefore, it is necessary to develop a battery cell capable of securing capacity while reducing dead space even though the battery cell is mounted in a device having an atypical shape.

In connection therewith, Patent Document 1 discloses a secondary battery configured such that a positive electrode active material layer and a negative electrode active material layer are formed by coating so as to be spaced apart from each other by a predetermined distance and including a bending region configured to be bent at an uncoated portion, which is not coated with the positive electrode active material layer and the negative electrode active material layer.

The secondary battery disclosed in Patent Document 1 is suitably applied to a long device but has a problem in that a plurality of bending regions is formed, whereby the uncoated portion is widened, and therefore energy density is lowered.

Patent Document 2 relates to a battery cell including a current collector having at least one uncoated portion that partitions an electrode mixture, wherein the portion of a battery case at which the uncoated portion is located is bent, whereby the shape of the battery cell is changed.

In Patent Document 2, an electrode assembly is separated from the battery case, whereby there is a problem in that a bent portion of the battery case and a bent portion of the electrode assembly may be misaligned with each other when the battery cell is bent.

Patent Document 3 discloses an electrode configured to have a structure in which an electrode active material is printed on a band type electrode current collector so as to have a pattern repeated at regular intervals.

However, the invention disclosed in Patent Document 3 relates to an electrode cut so as to have a predetermined length and width, wherein the electrode is received in a sheathing member in a state of being bent.

As can be seen from the above description, each of the above patent documents discloses only an electrode including an uncoated portion that is coated with no electrode mixture. Therefore, a method of manufacturing an electrode having the above structure or research on the shape of an electrode sheet is needed.

PRIOR ART DOCUMENTS (Patent Document 1) Korean Patent Application Publication No. 2012-0022385 (2012.03.12)

(Patent Document 2) Korean Patent Application Publication No. 2017-0033513 (2017.03.27)

(Patent Document 3) Japanese Patent Application Publication No. 1995-153438 (1995.06.16)

DISCLOSURE

Technical Problem

The present invention has been made in view of the above problems, and it is an object of the present invention to provide a method of manufacturing an electrode including a folding portion constituted by an uncoated portion having no electrode mixture formed thereon by coating in order to manufacture an electrode for foldable battery cells and an electrode sheet including the folding portion.

Technical Solution

An electrode manufacturing method according to the present invention to accomplish the above object includes a coating step of forming an electrode mixture coated portion on an electrode sheet so as to include an uncoated portion having no electrode mixture formed thereon by coating; a step of slitting the electrode sheet into a plurality of unit electrode sheets; and a step of notching the slit electrode sheet, wherein the uncoated portion includes an electrode tab formation portion and a folding portion formed so as to be parallel to a direction in which the electrode sheet is taken out.

In the electrode manufacturing method according to the present invention, the coated portion may be continuously formed so as to be parallel to the direction in which the electrode sheet is taken out.

In the electrode manufacturing method according to the present invention, the slitting step may be a step of slitting a coated portion located between the folding portion and another folding portion adjacent to the folding portion.

The electrode manufacturing method according to the present invention may include a step of forming the uncoated portion such that the width of the electrode tab formation portion and the width of the folding portion are different from each other.

In the electrode manufacturing method according to the present invention, the notching step may include a notching process for forming an electrode tab at the electrode tab formation portion and a process of notching the electrode sheet along a notching line in order to divide the electrode sheet into unit electrode sheets.

In addition, the notching process for forming the electrode tab and the process of notching the electrode sheet along the notching line may be simultaneously performed.

In the electrode manufacturing method according to the present invention, the electrode tab formation portion may be formed at each of opposite side ends and a middle portion of the electrode sheet that is taken out.

The electrode sheet may be slit into unit electrode sheets having two kinds of widths.

An electrode sheet according to the present invention includes a coated portion having an electrode mixture formed thereon by coating and an uncoated portion having no electrode mixture formed thereon by coating, wherein the uncoated portion includes an electrode tab formation portion and a folding portion formed so as to be parallel to a direction in which the electrode sheet is taken out.

In the electrode sheet according to the present invention, the coated portion, the electrode tab formation portion, and the folding portion may be formed so as to be symmetrical with respect to a slitting line.

In the electrode sheet according to the present invention, the folding portion may be an uncoated portion formed between the slitting line and the electrode tab formation portion.

In the electrode sheet according to the present invention, a first coated portion and a second coated portion may be formed on opposite sides of the folding portion, and the first coated portion and the second coated portion may be formed so as to have the same size.

In the electrode sheet according to the present invention, the width of the folding portion may be greater than the thickness of the coated portion x Π.

In addition, the present invention provides a battery cell including an electrode manufactured using the electrode manufacturing method, wherein the battery cell is configured to be bendable at the folding portion of the electrode.

Advantageous Effects

As is apparent from the above description, in an electrode manufacturing method according to the present invention, in order to form not only an uncoated portion, which is an electrode tab formation portion, but also an uncoated portion, which is configured to manufacture a folded electrode, on an electrode sheet, a method of coating a portion of the electrode sheet with an electrode mixture is used, whereby it is possible to reduce the number of manufacturing steps as compared to a method of coating the entirety of the electrode sheet with the electrode mixture and then removing the coating and to reduce defects that may occur during a coating removal process.

Also, in a notching process for manufacturing a unit electrode, notching is performed such that a folding portion is included in the unit electrode, whereby it is possible to obtain a unit electrode having a coated portion and an uncoated portion formed so as to have regular areas.

In addition, it is possible to manufacture a foldable battery cell using an electrode assembly including an electrode according to the present invention, and therefore it is possible to provide a battery cell usable in a device having a bent or curved shape.

DESCRIPTION OF DRAWINGS

FIG. 1 is a plan view of an electrode sheet according to an embodiment.

FIG. 2 is a plan view of an electrode sheet according to another embodiment.

FIG. 3 is a plan view showing a notching portion formed in the electrode sheet of FIG. 1.

FIG. 4 is a vertical sectional view of the electrode sheet of FIG. 3.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Embodiments of the present invention will be described in detail with reference to the accompanying drawings.

FIG. 1 is a plan view of an electrode sheet according to an embodiment.

Referring to FIG. 1, the electrode sheet 100 is taken out in an arrow direction, and FIG. 1 shows a start part of the electrode sheet that is taken out.

An electrode manufacturing method according to the present invention includes a coating step of forming an electrode mixture coated portion on an electrode sheet so as to include an uncoated portion having no electrode mixture formed thereon by coating, a step of slitting the electrode sheet into a plurality of unit electrode sheets, and a step of notching the slit electrode sheet.

Referring to FIG. 1, an electrode mixture coated portion 110 is formed at the electrode sheet 100 while the electrode sheet is taken out in an arrow direction. At this time, the coated portion 110 is formed such that an uncoated portion having no electrode mixture formed thereon by coating is formed.

The coated portion 110 may be formed at any one of the upper surface and the lower surface of the electrode sheet or may be formed at opposite surfaces of the electrode sheet.

The uncoated portion includes an electrode tab formation portion 120 and a folding portion 130 formed so as to extend in a direction parallel to a direction in which the electrode sheet is taken out.

In the electrode sheet according to the present invention, the uncoated portion and the coated portion are continuously formed in the direction parallel to the direction in which the electrode sheet is taken out.

A slitting line 140 is formed at the middle of the electrode sheet 100 in the direction in which the electrode sheet is taken out, and the coated portion 110, the electrode tab formation portion 120, and the folding portion 130 are formed so as to be symmetrical with respect to the slitting line 140.

The slitting line means a preliminary cutting line along which a cutter moves in order to divide the coated portion in the slitting step.

The slitting step is performed through a process of slitting a coated portion 110 located between a folding portion 130 and another folding portion 130 adjacent to the folding portion. At this time, in order to produce electrodes having uniform sizes, the slitting line 140 is set at a position at which the coated portion 110 is divided into two equal parts.

The folding portion 130 is an uncoated portion formed between the slitting line 140 and the electrode tab formation portion 120. In the case in which a battery cell including an electrode assembly manufactured using unit electrodes formed through the slitting and notching steps is manufactured and then folded, the folding portion is set to be an uncoated portion having no electrode mixture formed thereon by coating in order to prevent the electrode mixture from being separated from an electrode current collector.

Meanwhile, in order to prevent a positive electrode tab and a negative electrode tab from contacting each other in a stacking direction when a positive electrode and a negative electrode formed through slitting and notching are stacked in the state in which a separator is interposed therebetween, the electrode tab may be formed so as to be biased to one side from the outer periphery of the electrode from which the electrode tab protrudes. As shown in FIG. 1, therefore, electrode tabs formed at opposite sides of the electrode tab formation portion 120 in the direction in which the electrode sheet is taken out are formed so as not to overlap.

The present invention relates to an electrode manufacturing method for manufacturing an electrode that is folded on the basis of an x-axis and an electrode sheet, wherein a first coated portion 110a and a second coated portion 110b are formed at opposite sides of a unit electrode 101 formed through slitting and notching on the basis of the folding portion 130.

When the electrode is folded, the first coated portion 110a and the second coated portion 110b face each other, and therefore the first coated portion and the second coated portion may be formed so as to have the same size.

FIG. 2 is a plan view of an electrode sheet according to another embodiment.

Referring to FIG. 2, the electrode sheet 200 is taken out in an arrow direction, and FIG. 2 shows a start part of the electrode sheet that is taken out.

Unlike the electrode sheet of FIG. 1, the electrode sheet of FIG. 2 is configured to have a structure in which an electrode tab formation portion 220a is formed at each of opposite side ends of the electrode sheet 200 that is taken out and in which an electrode tab formation portion 220b is formed at a middle portion of the electrode sheet.

In addition, a coated portion 210, a folding portion 230, and a coated portion 210 are sequentially formed from the electrode tab formation portion 220a in an inward direction of the electrode sheet 200.

That is, the coated portions 210 are formed on opposite sides of the folding portion 230, and this form may be expressed as a coated portion 210 having a folding portion 230 formed at the middle thereof.

In addition, a coated portion 210 including a folding portion 230 is formed at each of the upper part and the lower part of the electrode sheet on the basis of the electrode tab formation portion 220b at the middle portion of the electrode sheet in the direction in which the electrode sheet is taken out.

The electrode sheet 200 has a structure in which the electrode sheet is slit along two slitting lines 240 to form three unit electrode sheets 251, 252, and 253. The unit electrode sheet 251 and the unit electrode sheet 253 have the same width, and the width of the unit electrode sheet 252 is formed so as to be greater than the width of each of the unit electrode sheets 251 and 253. Consequently, in the structure in which the electrode tab formation portions are formed at opposite side ends and the middle portion of the electrode sheet, as in the electrode sheet 200, unit electrode sheets having two kinds of widths are formed.

The slitting step is performed using a method of forming a slitting line 240 at the coated portion 210 located between the folding portions 230 and slitting the coated portion along the slitting line 240.

FIG. 3 is a plan view showing a notching portion formed in the electrode sheet of FIG. 1.

Referring to FIG. 3, the notching step includes a notching process for forming an electrode tab 102 at the electrode tab formation portion 120 and a process of notching the electrode sheet along a notching line 122 in order to divide the electrode sheet into unit electrode sheets 150.

The slitting line 140 that divides the electrode sheet 100 into a plurality of unit electrode sheets 150 is formed on the coated portion 110, and the notching line 122 is formed so as to be perpendicular to the slitting line 140 and is formed in the shape of a straight line passing through the coated portion 110 and the folding portion 130.

The notching process for forming the electrode tab and the process of notching the electrode sheet along the notching line may be sequentially performed. Alternatively, the notching process for forming the electrode tab and the process of notching the electrode sheet along the notching line may be simultaneously performed.

In the case in which the notching process for forming the electrode tab and the process of notching the electrode sheet along the notching line are simultaneously performed, it is possible to reduce an electrode manufacturing time.

FIG. 4 is a vertical sectional view of the electrode sheet of FIG. 3.

Referring to FIG. 4, FIG. 4 is a vertical sectional view of the electrode sheet cut in the x-axis of FIG. 3.

The uncoated portion may be formed such that the width W1 of the electrode tab formation portion 120 and the width W2 of the folding portion 130 are different from each other. For example, when considering a structure in which electrode tabs are not formed so as to overlap each other, the width W1 of the electrode tab formation portion 120 may be formed so as to be less than the width W2 of the folding portion 130. Alternatively, the width W1 of the electrode tab formation portion 120 may be formed so as to be greater than the width W2 of the folding portion 130 depending on the sizes of the electrode tabs.

The folding portion 130 is disposed so as to face each other in the state in which the electrode is folded. It is preferable for the width W2 of the folding portion 130 to be at least ½ of the circumference of a circle having the thickness H of the coated portion as a radius. Consequently, the width W2 of the folding portion 130 may be formed so as to be greater than the thickness H of the coated portion x Π.

Those skilled in the art to which the present invention pertains will appreciate that various applications and modifications are possible within the category of the present invention based on the above description.

DESCRIPTION OF REFERENCE SYMBOLS 100, 200: Electrode sheets
101: Unit electrode
102: Electrode tab
110, 210: Coated portions
110a: First coated portion
110b: Second coated portion
120, 220a, 220b: Electrode tab formation portions
122: Notching line
130, 230: Folding portions
140, 240: Slitting lines
150, 251, 252, 253: Unit electrode sheets
H: Thickness of coated portion
W1: Width of electrode tab formation portion
W2: Width of folding portion

INDUSTRIAL APPLICABILITY

As is apparent from the above description, in an electrode manufacturing method according to the present invention, in order to form not only an uncoated portion, which is an electrode tab formation portion, but also an uncoated portion, which is configured to manufacture a folded electrode, on an electrode sheet, a method of coating a portion of the electrode sheet with an electrode mixture is used, whereby it is possible to reduce the number of manufacturing steps as compared to a method of coating the entirety of the electrode sheet with the electrode mixture and then removing the coating and to reduce defects that may occur during a coating removal process.

Also, in a notching process for manufacturing a unit electrode, notching is performed such that a folding portion is included in the unit electrode, whereby it is possible to obtain a unit electrode having a coated portion and an uncoated portion formed so as to have regular areas.

Also, it is possible to manufacture a foldable battery cell using an electrode assembly including an electrode according to the present invention, and therefore it is possible to provide a battery cell usable in a device having a bent or curved shape.

The invention claimed is:

1. An electrode manufacturing method comprising:
coating an electrode mixture coated portion on an electrode sheet, leaving an uncoated portion of the electrode sheet having no electrode mixture formed thereon;
slitting the electrode sheet into a plurality of unit electrode sheets along a slitting line; and
then notching the electrode sheet along a notching line,

wherein the uncoated portion comprises:
first and second electrode tab formation portions; and
first and second folding portions each extending parallel to a direction in which the slitting line extends,
wherein the slitting line is formed on the electrode mixture coated portion and is located between the first and second folding portions at a location that divides the electrode mixture coated portion into two equal parts,
wherein the notching line is a straight line passing through the electrode mixture coated portion and one of the first folding portion or the second folding portion, the notching line extending perpendicular to the slitting line.

2. The electrode manufacturing method according to claim 1, wherein the coated portion is continuously formed and extends parallel to the direction in which the slitting line extends.

3. The electrode manufacturing method according to claim 1, wherein the slitting includes slitting part of the coated portion located between the first and second folding portions.

4. The electrode manufacturing method according to claim 1, wherein a width of the electrode tab formation portion and a width of the first and second folding portions are different from each other.

5. The electrode manufacturing method according to claim 1, wherein the notching comprises:
forming an electrode tab at the electrode tab formation portion; and
notching each unit electrode sheet along a notching line to divide the unit electrode sheet into a plurality of unit electrodes.

6. The electrode manufacturing method according to claim 5, wherein the forming of the electrode tab and the notching of each unit electrode sheet along the notching line are simultaneously performed.

7. The electrode manufacturing method according to claim 1, wherein the electrode tab formation portion includes first, second, and third electrode tab formation areas formed at each of first and second opposite side ends of the electrode sheet and a third middle portion of the electrode sheet, respectively.

8. The electrode manufacturing method according to claim 7, wherein the plurality of unit electrode sheets include first and second subsets of unit electrode sheets having two different widths.

9. An electrode manufactured using the electrode manufacturing method according to claim 1, wherein the electrode is configured to be bendable at the first folding portion.

10. The electrode according to claim 9, wherein a first part of the electrode mixture coated portion and a second part of the electrode mixture coated portion are formed on opposite sides of the first folding portion, and
wherein the first part of the electrode mixture coated portion and the second part of the electrode mixture coated portion have an identical size.

11. The electrode according to claim 10, wherein a width of the first folding portion is greater than a thickness of the electrode mixture coated portion x Π.

12. A battery cell comprising an electrode manufactured using the electrode manufacturing method according to claim 1, wherein the battery cell is configured to be bendable at the first folding portion of the electrode.

* * * * *